United States Patent [19]

F'Geppert

[11] 4,252,224
[45] Feb. 24, 1981

[54] CLUTCH EMPLOYING CONSTANT FORCE SPRINGS

[75] Inventor: Erwin F'Geppert, Novi, Mich.

[73] Assignee: The United States of America as represented by the Secretary of the Army, Washington, D.C.

[21] Appl. No.: 59,937

[22] Filed: Jul. 23, 1979

[51] Int. Cl.$^3$ .............................................. F16D 13/44
[52] U.S. Cl. .............................. 192/70.27; 192/70.28; 192/89 R
[58] Field of Search ............... 192/70.27, 70.28, 89 R; 188/166, 72.1

[56] References Cited

U.S. PATENT DOCUMENTS 810,783   1/1906   Maxwell ........................ 192/89 R X
1,861,080   5/1932   Chorlton ........................ 192/89 R X

FOREIGN PATENT DOCUMENTS 1002499   8/1965   United Kingdom .................. 192/89 R Primary Examiner—Rodney H. Bonck
Attorney, Agent, or Firm—Peter A. Taucher; John E. McRae; Nathan Edelberg

[57] ABSTRACT

A mechanical clutch comprising interposed clutch plates keyed to the input and output members for axial movement between driving positions frictionally engaged with one another and disengaged positions relaxed away from one another. The invention relates to the use of constant force, zero rate, springs for moving the clutch plates between the engaged and disengaged positions.

5 Claims, 2 Drawing Figures

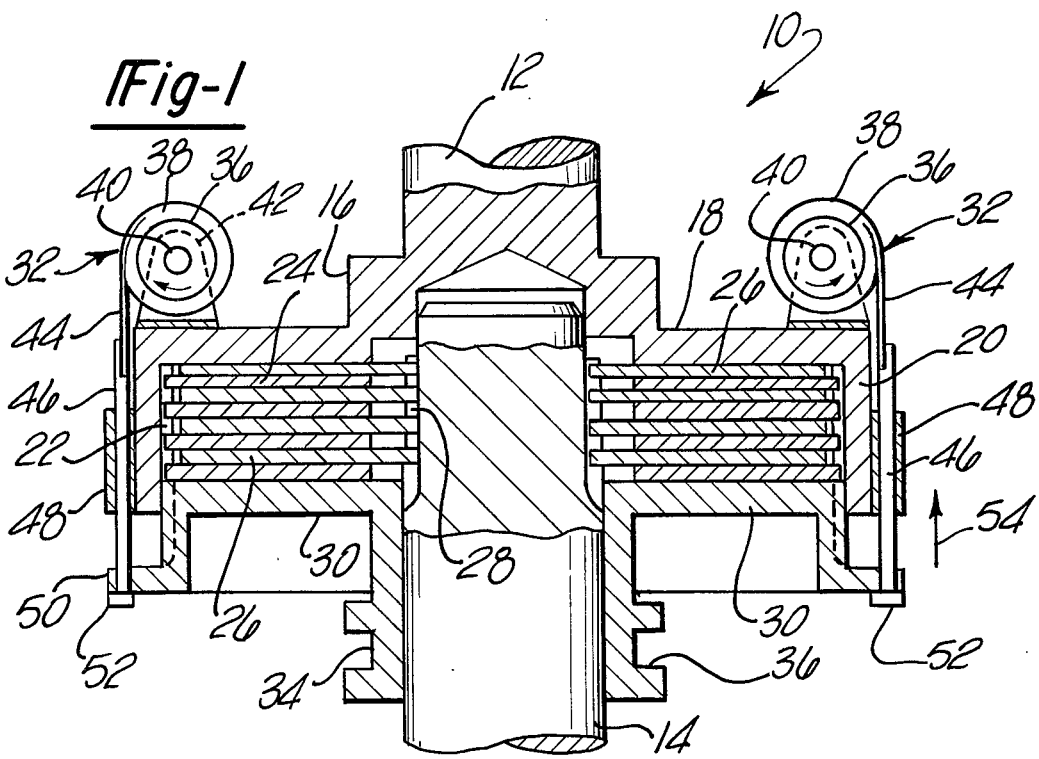
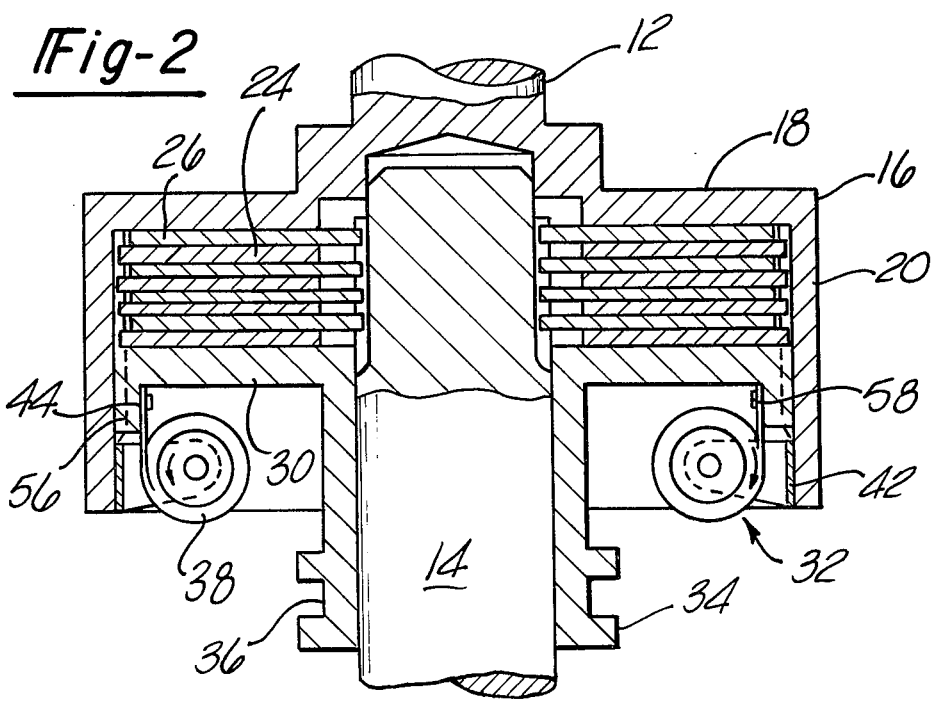

CLUTCH EMPLOYING CONSTANT FORCE SPRINGS

BACKGROUND AND SUMMARY OF THE INVENTION

It is known to provide a mechanical clutch between drive and driven members by the use of interposed facially-engaged clutch plates. In usual practice the axial forces on the clutch plates are controlled or varied by means of a shift collar connected to a presser plate, and a series of coil type compression springs arranged at circumferentially spaced points around the clutch axis. The shift collar is operated in one direction to increase (or decrease) the axial force; the springs vary the axial force in the opposite direction.

One problem associated with conventional clutches arises because of wear on the clutch plates. As the clutch is operated during its normal service life the clutch plates become thinner due to the frictional wear. As a result, the force of the compression springs changes. For example, in a system wherein the springs are employed to force the clutch plates into pressure engagement any appreciable wear on the clutch plates will require an extension of the compression springs beyond their initial designed extension, thus lessening the effective force applied to the plates. The plates will therefore tend to slip on one another, with consequent increased wear and acceleration of the undesirable wear-out action.

The present invention is directed to the use of constant force, zero rate, springs as force elements in mechanical clutches. Such springs apply the same force irrespective of plate thickness changes; consequently the plates will continue to have the same engagement force throughout the expected service life. This means a lessened possibility for plate slippage and accelerated wear action.

The invention described herein may be manufactured, used, and licensed by or for the Government for governmental purposes without payment to me of any royalty thereon.

IN THE DRAWINGS

FIG. 1 is a section view taken through a clutch that utilizes constant force springs to apply the axial force on the clutch plates.

FIG. 2 is a sectional view taken through another clutch that utilizes constant force springs to remove the axial force from the clutch plates.

Referring more particularly to FIG. 1, there is shown therein a mechanical clutch 10 comprising a drive shaft 12 and a driven shaft 14. Shaft 12 is connected to an annular housing 16 that includes a radial end wall 18 and an annular side wall 20. Side wall 20 is formed with internal splines 22 which function to key a first series of clutch plates 24 for axial movement within the housing. Plates 24 are interposed with second clutch plates 26, whose inner edges are keyed to splines 28 formed on the outer surface of shaft 14.

The plates 24 and 26 are pressed together into driving engagement by reason of axial forces applied to a presser plate 30 whose outer edge is keyed on splines 22. In the FIG. 1 clutch a series of constant force spring mechanisms 32 are arranged at circumferentially spaced points around housing 16 to apply an axial force on presser plate 30. The axial force is removed by means of a shift collar 34 attached to plate 30. The collar is operated by a manually-controlled yoke, not shown, having rollers engaged in the endless channel 36 defined by collar 34. Each spring mechanism 32 is preferably constructed substantially similarly to the commercially available spring mechanism supplied by the Hunter Spring Co. under the tradename "Negator".

FIG. 1 shows two spring mechanisms 32. However, it will be understood that in practice more than two such mechanisms will be employed, depending on the force required to operate the clutch plates. It is believed that as many as eight such spring mechanims can be arranged around the clutch plate housing without unduly increasing the housing diameter. Each spring mechanism 32 is preferably a constant rate spring mechanism comprised of a rotatable drum 36 having a coil of spring strip material 38, preferably steel, wound therearound. The drum is provided with axially-projecting axles 40 that are rotatably journaled in a U-shaped bracket 42 suitably mounted on end wall 18 of the clutch housing. The coil of spring strip material 38 comprises a large number of convolutions, e.g. fifty, prestressed or preformed to have a radius of curvature less than the radius of curvature of drum 36. As a result of this prestressing the coil of material 38 tends to wind itself onto the drum 36, thereby biasing the drum in the directions indicated by the curved arrows. The exposed or free edge portion 44 of each spring strip 38 is suitably secured to a circular rod 46, as by riveting or clamping, etc. Each rod 46 is maintained in a position parallel to the axes of shafts 12 and 14 by means of a tubular guide 48 suitably attached to the side wall 20 of housing 16. Each rod 46 extends through a hole in a flange 50 on pressure plate 30. As shown in FIG. 1, the rod is provided with an enlarged head 52 for applying an axial force to plate 30.

The effect of the spring mechanisms 32 is to continually apply an axial force on plate 30 in the direction depicted by arrow 54; the spring force remains the same irrespective of the axial position of plate 30. Therefore, changes in thicknes of the clutch plates 24 and 26 due to frictional wear will have no effect on the spring force applied through the pressure plate 30 to the clutch plates. Accordingly, there is a reduced tendency for the clutch plates to slip on one another after the plates have become thinner due to service conditions. Also, the use of constant force springs, as shown in the drawings, permits coarser tolerances on the plate thickness dimensions since it is not necessary that each plate have a precise thickness in order to provide a given initial spring deflection and spring force. The constant force springs compensate for manufacturing tolerance variations. The drawings show a clutch having four clutch plates 24 keyed to housing 16 and four clutch plates 26 keyed to shaft 14. However this is for illustration purposes. The actual number of plates can be less or greater than the number illustrated, depending on the design capacity of the clutch and the spring forces that are available within the commercial availability of spring mechanisms 32. In a representative clutch there may be approximately twenty clutch plates, each having a thickness of approximately five millimeters (about 0.2 inch); the stack of clutch plates in that case had an axial thickness of about 100 millimeters (4 inches). Wear on the clutch plates to about fifty percent of the clutch plate thickness produced an unsatisfactory slippage condition when conventional variable rate coil springs were employed as a plate operating force; the approximate two inch change in spring deflection due to the wear so greatly decreased the effect of spring force that it was impossible to keep the clutch operative. It is believed that the use of constant rate spring mechanisms as shown in FIG. 1 will eliminate this problem and increase the service life of the clutch without use of shims or spring seat adjustments, or frequent maintenance operations.

The invention can be employed in clutches wherein the spring mechanisms are used to remove the axial force from presser plate 30. One such arrangement is shown in FIG. 2, wherein components similar to those used in the FIG. 1 structure are depicted by similar reference numerals. In the FIG. 2 construction each spring mechanism 32 is mounted on the inner surface of the housing 16 side walls 20, with the free end 44 of the coil spring 38 secured directly to a flange 56 extending from presser plate 30. In this arrangement it is not necessary to use the rods 46 that are employed in the FIG. 1 structure. Operation of the FIG. 2 structure will be apparent from discussion of FIG. 1.

I wish it to be understood that I do not desire to be limited to the exact details of construction shown and described for obvious modifications will occur to a person skilled in the art.

I claim:

1. A clutch comprising an annular housing; a shaft extending into the housing on its axis; first radial clutch plates keyed to the housing for axial movement therewithin; second radial clutch plates keyed to the shaft for axial movement therealong; the first and second clutch plates being interposed to provide a driving connection between the housing and the shaft when the plates are pressed together; means for pressing the plates together comprising a plurality of constant force spring mechanisms mounted on the housing and a presser plate engaged with an endmost one of the clutch plates; each constant force spring mechanism comprising a rotatable drum and a coil of spring strip material wound therearound, the spring strip being preformed to a circular coil configuration having a lesser radius of curvature than the drum on which it is wound.

2. The clutch of claim 3, and further comprising a shift collar connected with the presser plate to withdraw said presser plate away from the clutch plates.

3. The clutch of claim 1; said annular housing comprising a radial end wall and an annular side wall extending axially therefrom; each constant force spring mechanism comprising a drum mounted on an exterior surface of the housing end wall, and a tensioned connector extending from each spring strip along the annular side wall to a mechanical connection with the presser plate.

4. The clutch of claim 3, and further comprising guides carried by the housing side wall for maintaining respective ones of the tensioned connectors parallel to the housing axis.

5. The clutch of claim 4; each tensioned connector consisting of a rod, each guide comprising a hollow tube.

* * * * *